(12) United States Patent
Burkhardt et al.

(10) Patent No.: US 6,830,274 B2
(45) Date of Patent: Dec. 14, 2004

(54) COVER FOR CLOSING AN OPENING IN A WALL

(75) Inventors: Steffen Burkhardt, Herrenberg (DE); Dietmar Preissler, Hagenbuch (DE); Anton Sautner, Treuchtlingen (DE)

(73) Assignee: Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 10/350,793

(22) Filed: Jan. 24, 2003

(65) Prior Publication Data

US 2004/0084451 A1 May 6, 2004

(51) Int. Cl.[7] .............................................. B62D 1/60
(52) U.S. Cl. ......................... 296/1.06; 293/1; 280/507
(58) Field of Search ........................... 296/190.11, 191, 296/154, 1.06; 293/1, 106, 117, 120; 49/463; 280/507

(56) References Cited

U.S. PATENT DOCUMENTS

| | | | | |
|---|---|---|---|---|
| 5,628,536 A | * | 5/1997 | Fulkerson | 293/117 |
| 5,765,312 A | * | 6/1998 | Szyjkowski | 49/463 |
| 5,934,699 A | * | 8/1999 | Blake | 280/507 |
| 6,581,955 B2 | * | 6/2003 | Aquinto et al. | 280/500 |

FOREIGN PATENT DOCUMENTS

DE           2936789 A1   *   4/1981

* cited by examiner

*Primary Examiner*—Jason Morrow
(74) *Attorney, Agent, or Firm*—Fulbright & Jaworski L.L.P.

(57) ABSTRACT

The present invention relates to a cover for closing an opening which is formed in a wall, especially in a trim part of a motor vehicle. The wall has on its inside in the area of the opening a supporting shape for the cover which makes it possible to turn the cover inserted in the opening between a closed position, wherein the cover closes the opening, and a tilted position around a tilt axis in which the cover is tilted from its closed position and is removable from the opening at the outside of the wall and/or insertable into the opening. On the cover a first ramp is formed which, when the cover is turned from its tilted position to the closed position, cooperates with a wall-mounted first guide such that the cover when in the closed position assumes a predetermined relative position. Alternatively or additionally a second ramp is formed on the cover, which cooperates with a wall-mounted second guide when the cover is turned from the closed position to the tilted position, such that the cover when in the tilted position assumes a predetermined position relative to the wall.

13 Claims, 2 Drawing Sheets

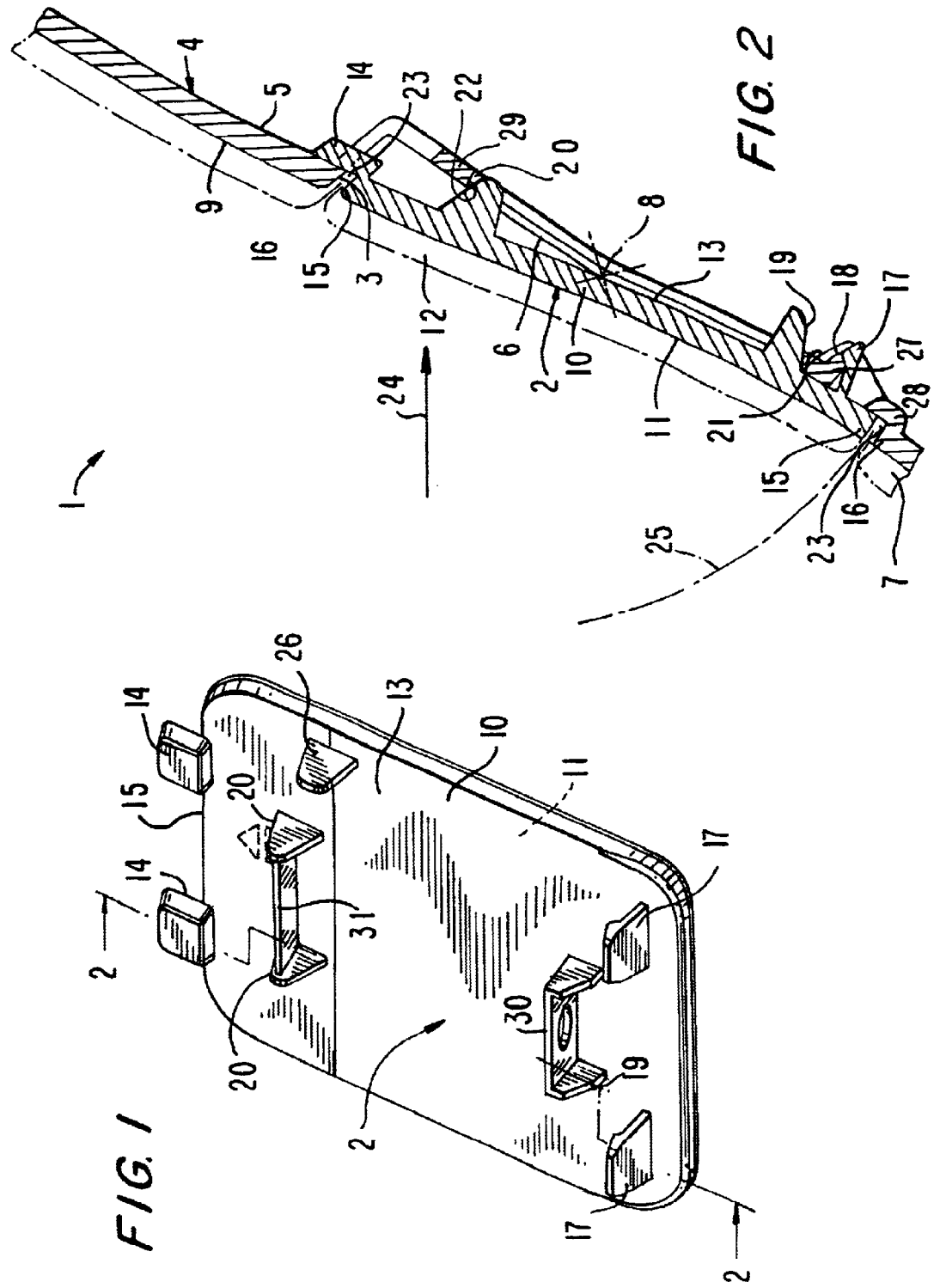

COVER FOR CLOSING AN OPENING IN A WALL

FIELD OF THE INVENTION

The present invention relates to a cover for closing an opening which is formed in a wall, especially a part of the body of a motor vehicle.

BACKGROUND AND SUMMARY OF THE INVENTION

A bumper of a motor vehicle is disclosed in DE 29 36 789 C2, in which an opening is created through which a device for towing the vehicle is accessible. To close this opening a cover is hinged on the bumper, which can be turned between a secured locking position in which it covers the towing device and a secured open position in which the towing device is accessible. The cover remains in its open position on the bumper.

The present invention deals with the problem of providing, for a cover of the kind referred to above, an improved embodiment to reduce especially the danger of damage to the wall and/or to the cover itself when the cover turns.

This problem is solved according to the invention by the subject matter of the independent claims. Advantageous embodiments are subject of the dependent claims.

The invention is based upon the general idea for achieving a predetermined, definite relative position between cover and wall with the aid of ramps for the closed position of the cover and/or for its tilted position. By this positive guidance of the cover when it turns between two defined end positions, the turning motion of the cover can be established such that any undesired, harmful contact between cover and wall is prevented, so that damage to the wall and/or the cover can be prevented.

The invention is of special interest whenever the wall involves a painted part of a body, especially that of a motor vehicle, e.g., a painted bumper trim. Usually, for an enhanced aesthetic effect, the cover is painted in the same way as the trim. The paint on the cover is comparatively delicate at its outer edge. By means of the invention a sufficient space between cover and wall in the closed state of the cover can be assured, while at the same time, when it is changed between the closed and tilted states, a sufficient space between cover and wall can be assured. Thus any contact of the outer edge of the cover with the inner edge of the opening can be effectively prevented.

Additional important features and advantages of the invention will be found in the sub-claims, the drawings and the corresponding description of the figures with the aid of the drawings.

It is evident that the features named above and those to be explained hereinafter can be used not only in the combination described in each case but also in other combinations or by themselves, without departing from the scope of the present invention.

A preferred embodiment of the invention is represented in the drawings and is further explained in the following description, wherein the same reference numbers correspond to the same or functionally equal components.

BRIEF DESCRIPTION OF THE DRAWINGS

FIG. 1 a perspective rear view of a cover according to the invention,

FIG. 2 a sectional view through the cover inserted into an opening in a wall, according to the section lines 2—2 in FIG. 1.

DETAILED DESCRIPTION

Figure 3:
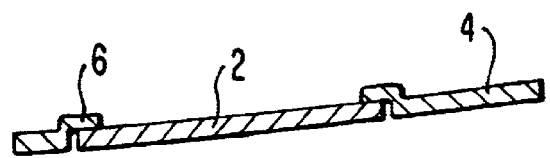
FIG. 3, FIG. 4, FIG. 5A and FIG. 5B are further views of the invention.
Figure 4:
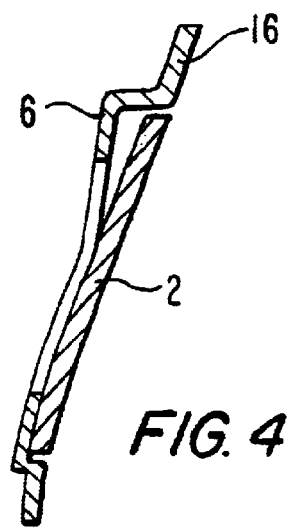
Figure 5A:
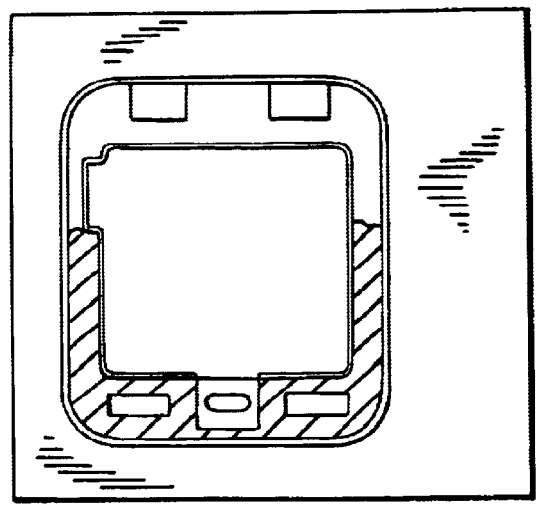
Figure 5B:
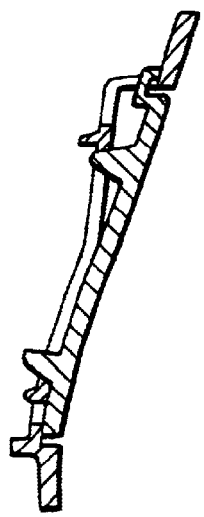

According to FIGS. 1 and 2 a cover and wall arrangement 1 comprises a cover 2 for closing an opening 3 which is located in a wall 4. This wall 4 can be formed, for example, by a part of the body of a motor vehicle. Preferably the wall 4 is formed by a bumper of a motor vehicle, especially a passenger car, wherein the opening 3 serves preferably to permit access through the bumper (wall 4) to a towing device, such as a tow ring or tow hook, for example.

The wall 4 has a shape 6 as a supporting shape for the cover 2. This supporting shape 6 runs around an edge 16 of the opening and is so configured or shaped that the cover 2 inserted into the opening 3 can be turned about a tilt axis 8 between a closed position shown in FIG. 2 and an open position. In FIG. 2 the cross section indicates that the axis 8 is perpendicular to the plane of drawing. The tilt axis 8 runs parallel to the cover 2.

In the closed position the cover 2 closes the opening 3. In contrast, the cover 2 when in the tilted position can be removed from the opening 3 or inserted into the opening 3 on the wall 4 from the outside 9 thereof. For this purpose the cover 2 has a wall section 10, which is shaped so as to be substantially complementary thereto, so that, when it is closed, this wall section 10 substantially fills the opening 3. Appropriately, a front side 11 of the wall section 10 facing away from the wall's inner side is shaped such that in the closed position it forms a component of the wall 4 that is integrated with the shape of the latter. That is to say, the cover 2 is adapted at its front side 11 to the outer shape of the wall 4. In the preferred embodiment, in which the wall 4 is formed by a bumper trim, the bumper trim (wall 4) can be provided with paint on its exterior 9. Preferably the cover then also has on its front side 11 coat of paint 12 in order to integrate the cover 2, both in appearance and feel, into the wall 4.

The wall section 10 has on its back 13, facing away from the wall's exterior in the closed position, two lugs 14. These lugs 14 protrude substantially radially, with respect to the tilt axis 8, over a margin 16 of the wall section 10 and of the cover 2, respectively. In the closed position according to FIG. 2, the lugs 14 catch behind the margin 16 of the opening 3 and rest against the wall's interior 5.

On its back 13 the wall section 10 furthermore bears two catch hooks 17 which are arranged opposite the lugs 14 with respect to the axis 8. The catch hooks 17 rise from the back 13 of the wall section 10 in the direction of rotation of the cover 2 with respect to the axis 8. In the closed state, the catch hooks 17 catch on a corresponding catch means 18 which is affixed to the wall. The catch hooks 17 are resiliently flexible radially with respect to the axis 8, so that a trouble-free releasable catching action can be achieved.

On its back 13, the wall section 10 furthermore has two first ramps 19 and two second ramps 20. The first ramps 19 cooperate with a first guide means 21 which is affixed to the wall. In contrast, the second ramps 20 cooperate with a second guide mans 22, which also is affixed to the wall.

The cover 2 operates as follows:

In the closed position represented in FIG. 2, the cover 2 is self-retained in the opening 3 and affixed to the wall 4.

This closed position is defined by the cooperation of the first ramps 19 with the first guide means 21, the result being a predetermined relative position between the cover 2 and wall 4. It is desirable that this desired relative position be selected such that a desired gap 23 occurs in the marginal area between cover 2 and wall 4, which has a preferably constant gap width along the cover's outer edge 15 and the opening's inner edge 16. In order to transfer the cover 2 from its closed position to its tilted position, a pressure is applied to the cover in the direction of the arrow 24 on the front side 11 of the wall section 10 in an area above the axis 8 remote from the catch hook 17; for example, the user presses with a finger in the direction of arrow 24 against the cover 2. This force 24 is converted by the shape 6 beyond the axis 8 to a traction force on the catch hook 17. If the force applied 24 is sufficiently great, the catch hooks 17, due to the chosen shape of catch hooks 17 and the catch shape 18, can yield radially with respect to the axis 8, so that the catch hooks 17 snap out of their catch shape 18 and come free.

Accordingly, the cover 2 can then tilt around the axis 8 to its tilted position.

In regard to its turning angle, the tilted position is defined substantially by the shape 6. But upon turning to the tilted position, however, the second ramps 20 additionally cooperate with the second guide means 22, so that, in changing to its tilted position, the cover 2 is positively guided, so that upon reaching the tilted position a definite desired relative position is established between cover 2 and wall 4.

By means of the ramps 19 and 20 in conjunction with guides 21 and 22, it is thus possible to assure that the cover 2, upon turning between its two end positions, will always have a minimum distance from the edge 16 of the opening, so that the danger of damage to the opening edge 16 and/or to the cover edge 15, especially the paints 7 and 12, is reduced.

In the tilted position, the cover 2 can now be drawn out of the opening 3. Opening 3 is then free. If opening 3 is to be closed again, first the cover 2 can be introduced into the opening 3 until it assumes its tilted position. Then the cover 2 can be returned to its closed position by a pressure applied to the front end 11 in an area opposite the catch 14 beyond the axis 8. Then the first ramps 19 cooperate with the first guide 21 and force the cover to reach its closed position into the predetermined, desired relative position between cover 2 and wall 4. As soon as the cover reaches its desired closed position, the catch hooks 17 catch on the catch shape 18. The curved path which the cover 2 describes at its outer edge 15 is indicated in FIG. 2 by a broken line.

By means of the ramps 19 and 20 and the guides 21 and 22, the relative position of the cover 2 with respect to the axis 8 is defined in the radial direction. For guidance parallel to the axis a lateral guide 26 can be formed on the back 13 of the wall section 10 and can stand away from the back side 13 and contact axially the edge 16 of the opening, and thus it cooperates in the guidance. It is clear that two or more such lateral guide elements 26 can be provided. Furthermore, the lateral guide element 26 can have a lateral ramp which, when the cover 2 is turned to its closed position, forces the cover 2 to be centered in the axial direction.

In the embodiment here shown, the two first ramps 19 and the two second ramps 20 are so arranged on the back 13 of the wall section 10 that they lie opposite one another with respect to the axis 8. This brings it about that the ramps 19 are associated with the closed position and the other ramps 20 with the tilted position. Accordingly, in this embodiment also the first guide 21 and the second guide 22 in the area of the opening 3 are arranged on the wall 4 such that they are opposite one another with respect to the axis 8.

Since the first ramps 19 are associated with the closed position, they are mounted with respect to the axis 8 on the same side as the catch hooks 17 on the back side 13 of the wall section 10. Appropriately, the first ramps 19 and the catch hooks 17 are separated from one another in the radial direction only relatively slightly with respect to the axis 8. By this arrangement the first guide 21 and the catch shape 18 can be formed on the same wall-mounted component 27. This component 27 is made in the form of a bridge which runs substantially parallel to the axis 8 in the marginal area of the opening 3. In the closed position in FIG. 2, this bridge 27 is arranged radially with respect to the axis 8 between the catch 1 and the first ramps 19. Furthermore, The wall section 10 lies with its back 13 against this bridge 27 when the cover 2 assumes its closed position. In the area of this component or bridge 27 a step 28 can furthermore be formed on the edge 16 of the opening, and will form an additional support for the edge 15 of the cover when it is in the closed position.

So that the two ramps 20 may be associated with the tilted position of the cover 2, they are provided on the back 13 of the wall sections opposite the catch hooks 17 with respect to the axis 8. Advantageously, here too the second guide 22 is formed on a bridge-like component 29. This bridge 29 runs in the marginal area of the opening 3 substantially parallel to the axis 8. Bridge 29 can be shaped so that the wall section 10 rests with its back 13 on the bridge 29 when the cover 2 is in the tilted position. Preferably, the first bridge 27 is associated with the first ramps 19 and the second bridge 29 is associated with the second ramps 20, each close to the edge 16 of the opening, so as to permit a maximum width of the opening 3 when the cover 2 is removed.

The first two ramps 19 are joined together by a first crosspiece 30 which also rises from the back 13 of the wall section 10. In like manner, the two second ramps 20 are joined together by a second crosspiece 31 which likewise rises from the back 13 of wall section 10.

According to a preferred embodiment, the wall section 10 together with the hooks 14, the catch hooks 17, the ramps 19 and 20, the lateral guiding element or elements 26 and the bridges 30 and 31 are in the form of a one-piece or monolithic component, especially an injection molding. To complete the cover 2 the wall section 10 can be provided with the paint 12 if desired.

What is claimed is:

1. A cover for closing an opening formed in a wall comprising:

a supporting shape for the cover on the inside of the wall near the opening which makes it possible to turn the cover inserted into the opening between a closed position wherein the cover closes the opening, and a tilted position about a tilt axis wherein the cover is tilted in relation to its closed position and is at least one of removable at the outside of the wall from the opening and is insertable into the opening;

said cover having a wall section having a back and a front, wherein said all section is of a shape substantially complementary to said opening and substantially fills said latter in the closed position, wherein said wall section back faces away from a wall exterior in the closed, position and at least one lug which protrudes substantially radially, with respect to the said tilt axis, beyond a margin of said wall section, and in the closed position is engaged behind a margin of said opening, said wall section having on said back at least one catch opposite said at least one lug, which project from the back with respect to the tilt axis substantially in the direction rotation, and in the closed position is snapped onto a catch shape, while in the closed state, an application of pressure to a front side of the wall section, facing away from said back, in an area lying opposite said at least one catch with respect to the tilt axis, results in the disengagement of the at least one catch from the catch shape and results in the turning of the cover out of its closed position to its tilted position, said wall section comprising on said back at least a one first ramp and at least one second ramp, wherein, when the cover is turned from the tilted position to the closed position, the at least one first ramp cooperates with a first wall mounted guide means such that the cover assumes in the closed position a predetermined position relative to the wall, and when the cover turns from the closed position to the tilted position, said at least one second ramp cooperates with a wall mounted second guide such that the cover in the tilted position assumes a predetermined position relative to the wall.

2. A cover according to claim 1, wherein said at least one first ramp and said at least one second ramp are arranged opposite one another, with respect to the tilt axis, on said back of said wall section.

3. A cover according to claim 2, wherein said first wall mounted guide and said second wall mounted guide are arranged opposite one another on the wall in the area of the opening with respect to the tilt axis.

4. A cover according to claim 1, wherein said first ramp and said at least one catch are arranged on the same side, with respect to the tilt axis, on said back of said wall section.

5. A cover according to claim 1, wherein first wall mounted guide and said catch shape are formed on the same wall-mounted component which is arranged in the closed position between the at least one catch and the at least first ramp.

6. A cover according to claim 1, wherein said first wall mounted guide is formed on a first bridge which runs in the marginal area of the opening substantially parallel to the tilt axis and on which the wall section rests with its back in the closed position.

7. A cover according to claim 1 wherein said at be least one second ramp and said at least one catch are arranged opposite one another with respect to the tilt axis on said back of said wall section.

8. A cover according to claim 1, wherein said second wall mounted guide is formed on a second bridge which runs in the marginal area of the opening substantially parallel to the tilt axis and rests with its back on said wall section in the tilted position.

9. A cover according to claim 1, wherein said front of said wall section is shaped such that in the closed position it forms a shape-integrated component of the wall.

10. A cover according to claim 1, wherein two first ramps are provided and are connected together by a first crosspiece.

11. A cover according to claim 1, wherein the wall is formed by a bumper trim piece of a motor vehicle and, the opening permits access to a towing device.

12. A cover according to claim 1, wherein two second ramps are provided and are connected together by a second crosspiece.

13. A cover-and-wall system comprising:

a cover for closing an opening which is formed in a wall;

said wall having an inside and an exterior wherein on said inside in the area of said opening there is a supporting shape for said cover which makes it possible to close said cover inserted into the opening between a closed position wherein said cover closes the opening and a position in which it is tilted about a tilt axis, wherein the cover is tilted with respect to its closed position and on an outside of said wall is at least one of removable from the opening and insertable into said opening;

wherein said cover has a wall section having a back, wherein said wall section is shaped substantially to complement said opening and substantially fills said opening in the closed position;

said wall section having on said back facing away from said exterior in the closed position at least one lug which projects substantially radially, with respect to the tilt axis, past a margin of said wall section and in the closed position it reaches in back of a margin of said opening;

said wall section having on its back with respect to the tilt axis opposite said at least one lug at least one catch which rises from the back with respect to the tilt axis and in the closed position is snapped onto a catch shape;

wherein an application of force to a front side facing away from the back of the wall section in an area which lies opposite said at least one catch with respect to the tilt axis, and leads to disengagement of said at least one catch from catch shape and to the turning of the cover out of its closed position to its tilted position;

said wall section comprising on said back at least one first ramp and at least one second ramp, said at least one first ramp cooperating, when the cover is turned from the tilted position to the closed position, with a first wall-mounted guide, such that the cover assumes in the closed position a predetermined position relative to the wall;

wherein said at least one second ramp cooperates, when said cover is turned from the closed position to the tilted position, with a wall-mounted second guide such that in the tilted position said cover assumes a predetermined position relative to the wall.

* * * * *